(12) United States Patent
Yeo (10) Patent No.: US 7,788,235 B1
(45) Date of Patent: Aug. 31, 2010

(54) EXTRUSION DETECTION USING TAINT ANALYSIS

(75) Inventor: Matthew Yeo, Los Angeles, CA (US)

(73) Assignee: Symantec Corporation, Mountain View, CA (US)

(*) Notice: Subject to any disclaimer, the term of this patent is extended or adjusted under 35 U.S.C. 154(b) by 1006 days.

(21) Appl. No.: 11/537,020

(22) Filed: Sep. 29, 2006

(51) Int. Cl.
*G06F 17/00* (2006.01)

(52) U.S. Cl. ............... 707/687; 707/703; 707/E17.012; 707/E17.039; 707/999.006; 707/999.009

(58) Field of Classification Search .............. None
See application file for complete search history.

(56) References Cited

U.S. PATENT DOCUMENTS

| | | | |
|---|---|---|---|
| 7,493,491 B2* | 2/2009 | Ootsuka et al. | 713/176 |
| 2004/0230807 A1* | 11/2004 | Baird et al. | 713/182 |
| 2004/0236747 A1* | 11/2004 | Swimmer et al. | 707/9 |
| 2006/0136570 A1* | 6/2006 | Pandya | 709/217 |
| 2007/0294253 A1* | 12/2007 | Strub et al. | 707/9 |

OTHER PUBLICATIONS

"Digital Guardian: Consumer Data Protection," Verdasys, Inc., 2006, 1 page.
"Information Leakage Detection & Prevention: Intellectual Property Leakage," Oakley™ Networks, 2005, 1 page.
"Information Leakage Detection & Prevention: Supported Programs for SureView Collectors," Oakley™ Networks, 2005, 1 page.
"Monitor and Discover Electronic Threats, Both Known and Unknown with Reconnex: Reconnex Architecture," Reconnex, 2006, [online] [Retrieved on Sep. 28, 2006] Retrieved from the Internet<URL:http://www.reconnex.net/products/architecture.asp>.
Newsome, J. et al., "Dynamic Taint Analysis for Automatic Detection, Analysis and Signature Generation of Exploits on Commodity Software," 17 pages.
"Platform: Digital Guardian Global Data Security," Verdasys, Inc., 2006, 2 pages.
"Real-Time Content Monitoring, Risk Discovery, and Risk Remediation from Reconnex," Reconnex 2006, [online] [Retrieved on Sep. 28, 206] Retrieved from the Internet<URL:http://www.reconnex.net/products/default.asp>.
"Vontu:: Products," Vontu, 2006, [online] [Retrieved on Sep. 28, 2006] Retrieved form the Internet<URL:http://www.vontu.com/products/default.asp>.

* cited by examiner

*Primary Examiner*—Don Wong
*Assistant Examiner*—Andalib F Lodhi
(74) *Attorney, Agent, or Firm*—Fenwick & West LLP (57) ABSTRACT

An extrusion detection system prevents the release of sensitive data from an enterprise. The system includes administration module for broadcasting taint instructions, each of which include a definition of sensitive data. The system also includes a plurality of extrusion detection nodes. Each node marks sensitive data as tainted responsive to the taint instructions, marks data that depends on sensitive data as tainted. When the potential release of tainted data is detected, an action is executed responsive to the taint instructions.

19 Claims, 5 Drawing Sheets

EXTRUSION DETECTION USING TAINT ANALYSIS

BACKGROUND OF THE INVENTION

1. Field of the Invention

This invention pertains in general to computer security and in particular to using taint analysis to secure an enterprise from attacks from within the enterprise.

2. Description of the Related Art

Corporate computer networks store large amounts of sensitive confidential and proprietary data. The release of sensitive data such as source code, design documents, trade secrets, confidential customer information, or business plans to outsiders represents a significant threat to companies and enterprises. Security systems have largely focused on protecting corporate data from hackers through a variety of means including encryption, restricted access protocols, firewalls, and monitoring services.

While these measures are largely directed towards fending off external attacks, the release of sensitive data from insider sources also represents a significant problem. Sensitive information can "leak" out of organizations in various ways. An employee may inadvertently forward or send such information to an external recipient. The information may also be mistakenly copied to an external drive along with the employee's personal files. Employees away from the office may transfer sensitive files to a home computer or other unsecured environment.

Conventional methods of extrusion detection are directed at combating such innocent leaks. For instance, filters can be applied based on particular keywords or other ways of identifying sensitive documents. When the filter detects that a confidential document is to be released, an administrator is alerted or the release is blocked from taking place.

Such methods are largely ineffective in preventing leaks of sensitive data that has been compressed, encrypted or otherwise obfuscated. Techniques of obfuscation are more likely to be undertaken by malicious insiders, who represent a greater threat to the enterprise. Such insiders hide sensitive data by transforming it into a form that cannot be recognized by existing extrusion detection techniques. The data is transferred in its obfuscated form to external systems, where it is processed into a form suitable for unauthorized use. Corporations have few ways of preventing motivated insiders who know about data loss prevention systems in place from easily evading them through data obfuscation.

Thus, there is a need for a way to detect and prevent the leakage of obfuscated sensitive data from an enterprise.

BRIEF SUMMARY OF THE INVENTION

The above need is met by an extrusion detection system that prevents the release of sensitive data from an enterprise despite the manipulation of the data by users within the enterprise.

In an embodiment, an extrusion detection system includes an administration module that broadcasts extrusion detection instructions. These instructions include a definition of sensitive data and an action to be taken upon the potential release of the sensitive data. A plurality of extrusion detection nodes mark sensitive data as tainted based on the extrusion detection instructions. Each of the nodes also marks data that depends on sensitive data as tainted and monitors the release of sensitive data from the enterprise. When an extrusion detection node detects the potential release of tainted data, it executes an action in accordance with the extrusion detection instructions broadcast by the administration module.

In another embodiment, a computer program product can be used to prevent the unwanted release of data from a computer. The product includes computer program instructions for indicating in a memory that data stored on the computer is tainted, monitoring transactions performed on the computer, and monitoring an exit from the computer for the potential release of tainted data from the computer. The instructions also specify that when a transaction propagates tainted data in the memory of the computer, the propagated data is also tainted. According to the instructions, an action to prevent the release from occurring is executed upon the potential release of outbound tainted data from the exit.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
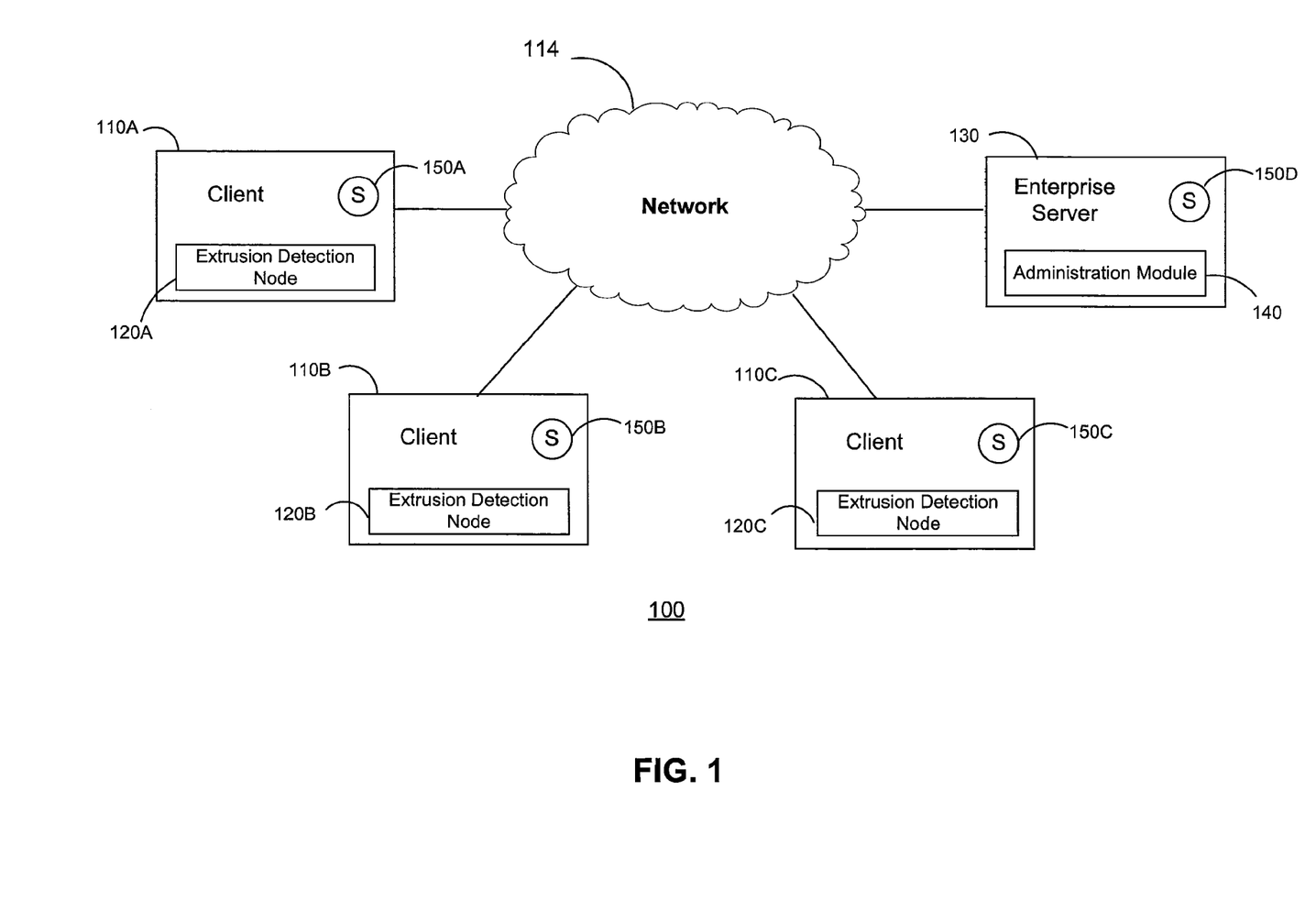
FIG. 1 is a high-level diagram illustrating a typical environment in which an extrusion detection system could be used to detect the release of sensitive data from sources within an enterprise.

FIG. 1 is a high-level block diagram of an enterprise environment 100 in which an extrusion detection system may be used to detect the leakage of sensitive data. The environment 100 includes an enterprise server 130 and several client computers 110 communicatively coupled to each other via a network 114. Sensitive data 150A-150D is present in multiple locations and is at risk of leaving the environment 100 in several different ways, including through the network 114 to external systems (not shown) and the physical transfer of the data to insecure media. Embodiments of the invention can be used to prevent the unwanted leakage of sensitive data 150A-150D from the enterprise environment 100. The environment includes an extrusion detection system including an administration module 140 and a plurality of extrusion detection nodes 120.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A," "110B," "110C," and/or "110D" in the figures).

The network 114 enables data communication between and among the entities shown in FIG. 1 and in one embodiment is the Internet. In another embodiment, the network 114 is a local area network (LAN) or wide area network (WAN) operated by an enterprise that may or may not be coupled to the Internet. In one embodiment, the network 114 uses standard communications technologies and/or protocols. Thus, the network 114 can include links using technologies such as Ethernet, 802.11, integrated services digital network (ISDN), digital subscriber line (DSL), and asynchronous transfer mode (ATM). Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 114 can be represented using technologies and/or formats including the hypertext markup language (HTML), the extensible markup language (XML), the simple object access protocol (SOAP) etc. In addition, all or some of links can be encrypted using conventional encryption technologies such as the secure sockets layer (SSL), Internet Protocol security (IPsec), Secure HTTP and/or virtual private networks (VPNs). In another embodiment, the entities can use custom and/or dedicated data communications technologies instead of, or in addition to, the ones described above.

Sensitive data 150 is present in various parts of the enterprise environment 100. The data 150 may include any type of information, data, or communication that an organization wishes to prevent from leaving the organization including organizational charts, directories, customer addresses or contact information, credit card numbers, products offered for sale, compensation information, medical histories, employment files, billing records, employee personal data, social security numbers etc. It may comprise "meta-data" about confidential data including passwords, encryption schemes, access pathways, IP addresses, or other information that could be used to access or retrieve secret information. Sensitive data can take various forms and be identified at various levels of abstraction, including, for instance folders, files, portions of files, documents, programs, applications, and executable files.

Sensitive data 150 within an enterprise environment 100 may be generated by various sources. The information may be collected or received by various departments within the environment 100 including for instance, customer service, and stored on one or more enterprise servers 130. It may also be provided to the enterprise 100 by external vendors or generated internally. Access to the sensitive data may be restricted in various ways, i.e. through encryption, password protection, or other means, thus providing a local security layer to protect sensitive data that can complement an extrusion detection system including administration module 140 and extrusion detection nodes 120 such as the one described in connection with FIG. 5. In other embodiments, multiple copies of sensitive data 150 are obtained from the enterprise server 130 and stored locally 110. In other embodiments, single or few copies of sensitive data 150 in an enterprise are kept in individual client computers 110.

The client computers 110 are utilized by end users in their operations in the enterprise 100. In one embodiment, a client computer 110 is a typical personal computer such as an IBM-PC or Apple Macintosh compatible computer. In another embodiment, a client computer 110 is another type of electronic device, such as a mobile telephone, personal digital assistant (PDA), or portable email device. Malicious insiders may use programs, functions, or calls on the client computer 110 or enterprise server 130 to manipulate and obfuscate the sensitive data 150. Each of the client computers 110 and the enterprise server 130 have one or more ports through which sensitive data 150 could be released beyond the enterprise environment 100.

Each of the client computers 110 has an extrusion detection node 120 that is designed to detect the potential release of sensitive data 150. In an embodiment, this is accomplished by indicating in memory that sensitive data is sensitive, and then tracking the status of transactions that propagate the data in a memory. The propagated data is also marked as sensitive, allowing it to be recognized if a release is attempted. One method of marking data as sensitive and propagating its sensitive status can be accomplished through the use of taint analysis. Although reference is made in the present description to methods described in "Dynamic Taint Analysis for Automatic Detection, Analysis, and Signature Generation of Exploits on Commodity Software," (Proceedings of the 12th Annual Network and Distributed Systems Security Symposium, February 2005) by Dawn Song and James Newsome of Carnegie Mellon University, as known to one of skill in the art, other methods for accomplishing taint analysis, as well as other ways of designating and propagating sensitive data, may also be used. Such methods may be accomplished in software, hardware, and/or firmware.

In an embodiment, sensitive data 150 is marked as tainted in accordance with instructions provided to the extrusion detection nodes 120 from an administration module 140 on the enterprise server 130. The taint is propagated as the sensitive data 150 is made into a reference for other data, or data is otherwise made to depend on the sensitive data, on a client computer 110. When a user of a client computer 150 attempts to release sensitive data 150 which has been marked as tainted, in original or manipulated form, the extrusion detection node 120 executes an action to prevent the release from happening. This technique reduces the risk that sensitive data 150 will leave the client 110 in any form, even if it has undergone an arbitrary amount of transfers and/or modifications.

Portions of the administration module 140 and extrusion detection nodes 120 may be implemented in hardware, software, and/or firmware. In the environment 100 shown, the enterprise server 130 hosts the administration module 140 and each client 110 hosts its own copy of an extrusion detection node 120. As one of skill in the art will know, however, any of a variety of configurations may be used to implement embodiments of the invention. The administration module 140 may be hosted on a client computer 110, or in another location such as a server of a third party security provider, for instance. Likewise, one or more elements of an extrusion detection node 120 may be administered on an enterprise server 130 or other location.

Figure 2:
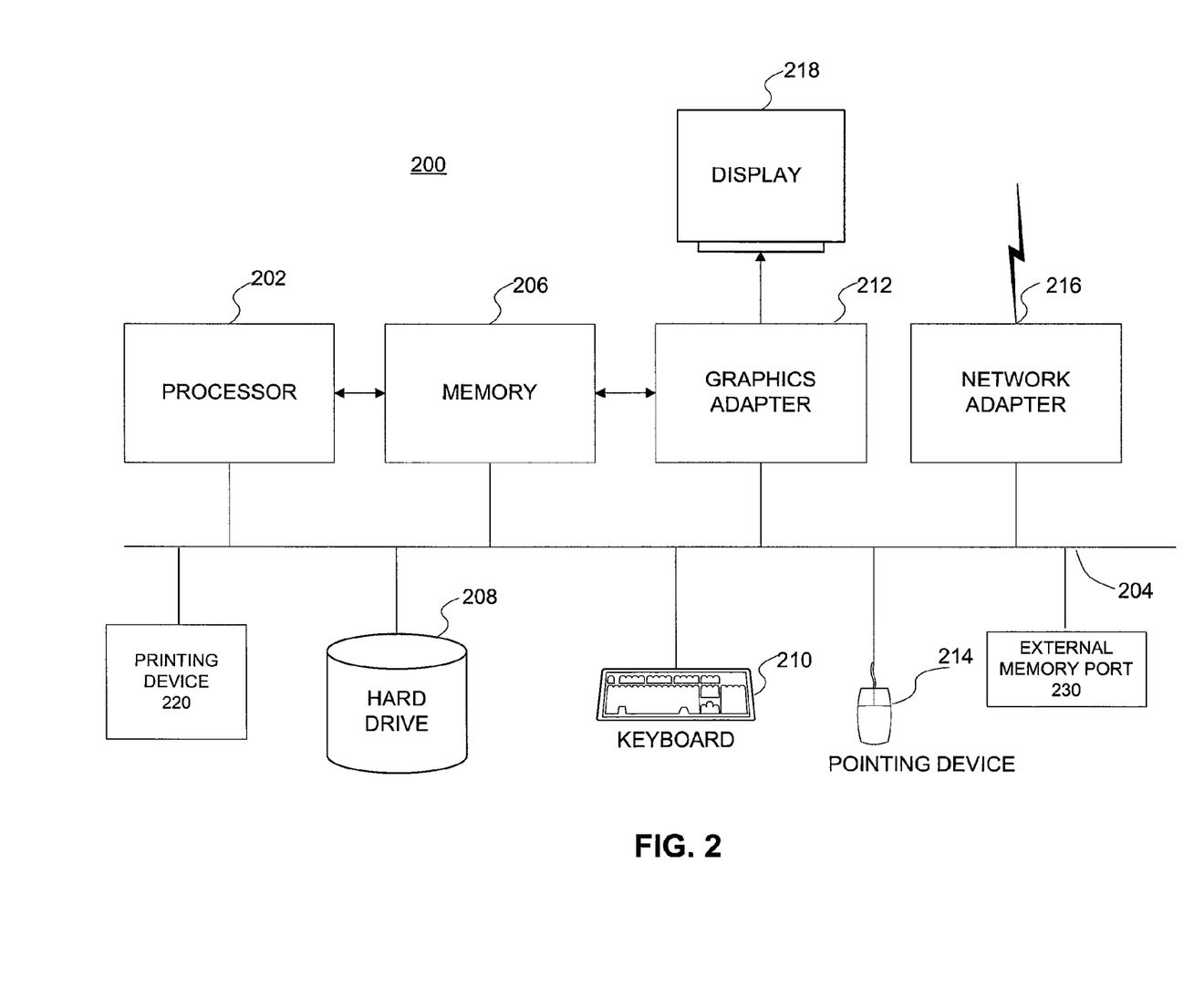
FIG. 2 is a high-level block diagram showing a computer system for use as a client computer or enterprise server according to one embodiment.

FIG. 2 is a high-level block diagram showing a computer system 200 for acting as an enterprise server 130 and/or a client computer 110 according to one embodiment. Illustrated are at least one processor 202 coupled to a bus 204. Also coupled to the bus 204 are a memory 206, a storage device 208, a network adapter 216, a graphics adapter 212, and several peripheral devices including a pointing device 214, a keyboard 210, a printing device 220 and an external memory port 230. A display 218 is coupled to the graphics adapter 212. One or more of the peripheral elements connected to the bus 208, 210, 214, 204, 220, 230 may be coupled to the bus physically or wirelessly, through a wireless, 802.11, Bluetooth, or other connection.

In one embodiment, the functionality of the bus 204 is provided by an interconnecting chipset. The bus 204 shown in FIG. 2 is an abstract representation of the interconnections provided by such a chipset. Computer systems acting in different roles may have different and/or additional elements than the ones shown in FIG. 2. For example, a computer system 200 acting as an enterprise server 130 may have greater processing power and a larger storage device than a computer system acting as a client computer 110. Likewise, a computer system acting as an enterprise server 130 may lack devices such as a display 218 and/or keyboard 210 that are not necessarily required to operate it.

As is known in the art, the computer system 200 is adapted to execute computer program modules. As used herein, the term "module" refers to computer program logic for providing the specified functionality. A module can be implemented in hardware, firmware, and/or software. When utilized, the modules are loaded into the memory 206 and executed by the processor 202.

Sensitive data 150 stored on a computer system 200 may be transformed on the processor 202 into a form that renders the data difficult to locate or recognize by conventional means. As one of skill in the art would understand, various transactions could accomplish this transformation, including copying, encrypting, moving, renaming, mapping, or placing the sensitive data 150 in a new location.

There are several routes by which sensitive data may leave the computer system 200. It may be printed by a printing device 220 to a paper or electronic output. It may be written to a portable storage medium coupled to the external memory port 230. The portable medium could comprise a tape, disk, flash memory, smart drive, USB memory, CD-ROM, DVD, or other magnetic, optical, temporary computer, or semiconductor memory. Data may also be provided through various software or hardware interfaces to external computers through the network adapter 216. Copies of data may be transferred electronically through the network adapter 216 to the network to any of a variety of destinations, for instance routed through the Internet according to a simple mail transfer protocol, a file transfer protocol, or any other protocol for outbound traffic.

Figure 3:
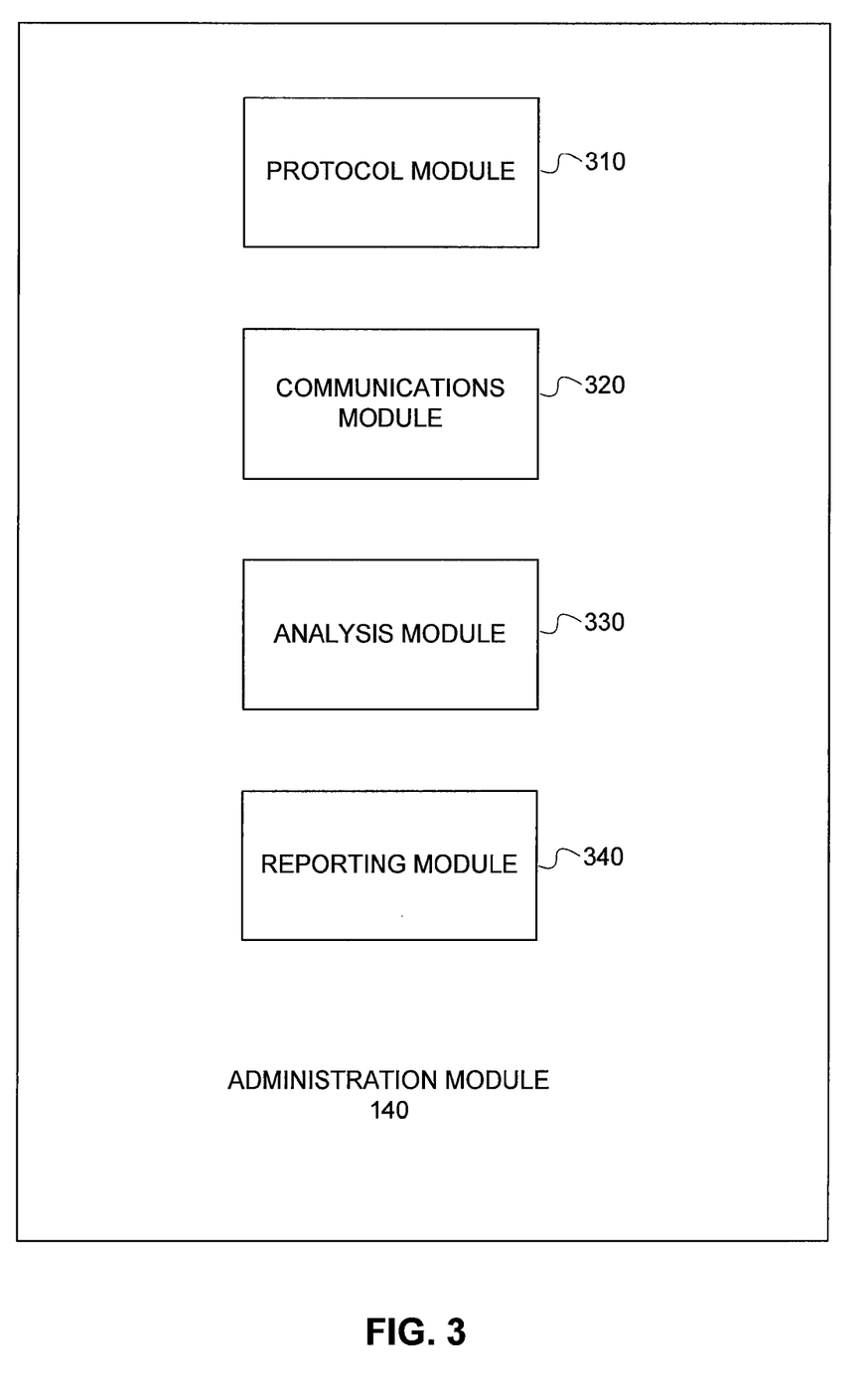
FIG. 3 is a high-level block diagram of an administration module according to one embodiment.
Figure 4:
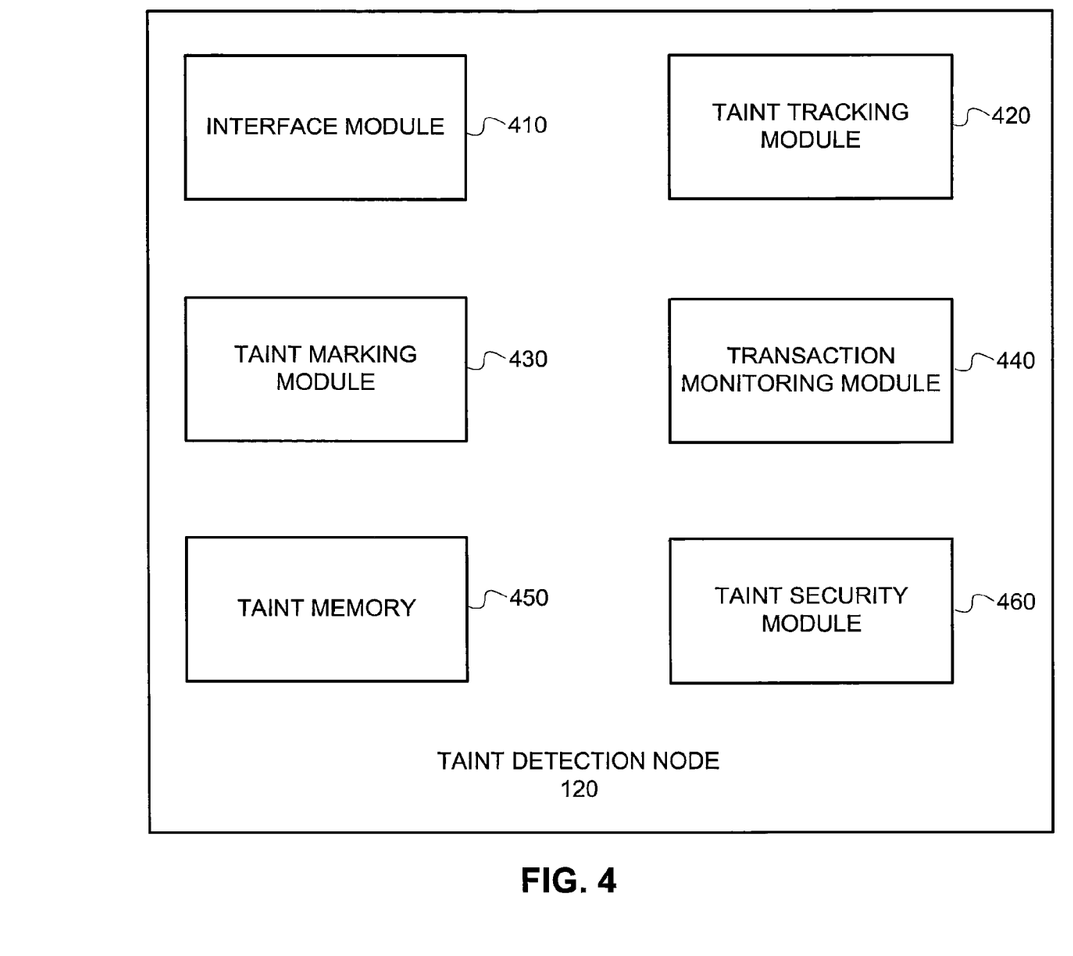
FIG. 4 is a high-level block diagram of an extrusion detection node for use on a client computer according to one embodiment.

FIGS. 3 and 4 are high-level block diagrams illustrating more detailed views of an extrusion detection node 120 and administration module 140, respectively, according to one embodiment. Those of skill in the art will recognize that other embodiments can have different and/or additional modules than those shown in FIG. 3 and FIG. 4. Likewise, the functionalities can be distributed among the modules in a manner different than described herein.

FIG. 3 depicts administration module 140 according to one embodiment. The administration module 140 may be hosted on a client computer 110 or enterprise server 130 within an enterprise 100, or may be stored on an external system and administered over a network 114. The administration module 140 creates and broadcasts protocols to client computers 110 for handling sensitive data, and keeps track of the movement of sensitive data within an enterprise.

The protocol module 310 accepts various inputs regarding sensitive data and the actions that should be taken if a release of sensitive data is attempted. Sensitive data may be identified by an administrator or other personnel within an enterprise 110. In an embodiment, a user of a client computer 110 can provide an input that indicates that data stored on the client 110 is sensitive and send a message over a network 114 to the protocol module 310 instructing that the data be tainted if it is sent to other computers 110 in the enterprise. The sensitive data can be designated in various ways. For instance, the user may provide the IP address of a computer 110 on which the data is stored as well as the pathway and name of a file or folder comprising the sensitive data.

Various levels of security can be applied to categories of sensitive data and are reflected in instructions developed by the protocol module 310. For instance, data such as reporting numbers that are highly sensitive may receive a level four priority, and any release of the information blocked. Different rules may apply to data that is less sensitive. For instance, a company directory could be given a level one priority, which means that it can be printed and sent within the company, but not outside of the company. For other types of data, the intra-company transfer of the data may be permitted while other releases are prohibited. However, the applicable protocol may dictate that the taint definition or protocol associated with the sensitive data be distributed whenever the sensitive data is transferred within the company.

The protocol module 310 uses these inputs to create operational instructions for carrying out tainting protocols. For instance, these instructions could designate that a confidential organizational chart is sensitive, what should trigger an action (e.g. printing, emailing, sending, burning to disk, transferring to an external unsecured server) and what action should be taken if the trigger activity takes place. The instructions can identify the sensitive data through any variety of means. As the specific location of copies of sensitive information are likely to differ on various client computers, the instructions may comprise patterns of sensitive information, a signature, or a hash file by which the sensitive data can be found on each system.

The communications module 320 of the administration module 140 broadcasts these instructions to various client computers 110. In an embodiment, instructions are constantly sent and updated as the definitions of sensitive data evolve. In another, instructions are distributed on a regular schedule, such that the taint protocol associated with the sensitive data is broadcast before the data is distributed in an enterprise 100. The communications module 320 may distribute certain instructions selectively, to specified groups of users, while broadcasting others throughout the organization. In an embodiment, scanning to mark data that matches distributed taint definitions takes place when definitions of sensitive data are received.

The communications module 320 can send and receive other communications to and from client computers 110. Such communications may include, for instance, confirmations of taint protocols and instructions, queries from users regarding the policies and protocols, and log reports regarding activity involving sensitive data and the its possible release by individual computers 110. In an embodiment, the administration module 140 includes an analysis module 330 coupled to a memory for storing reports of taint activity and detection received from client computers 110. The analysis module 330 can be used by an administrator to conduct post-release investigations, perform analyses to identify false positives, or perform any of a variety of diagnostic actions based on the attempted release of sensitive data. In a post-release investigation, for instance, the analysis module 330 could be used to generate reports that track the status of copies of the released sensitive data on a group of client computers 110, including how, when, and by whom they were accessed and manipulated.

A reporting module 340 reports the results of the analyses performed by the analysis module 330. The reporting module 340 is operator-configured to generate a variety of possible reports. In an embodiment, the reporting module 340 is used to generate reports that identify suspicious behavior or potential malicious insiders.

FIG. 4 depicts an extrusion detection node 120 according to one embodiment. The extrusion detection node 120 is hosted on a client computer 110 within an enterprise 100. In an embodiment, the extrusion detection node 120 comprises an application launched whenever the computer 110 is turned on that runs in the background during operation of the computer 110. In another embodiment, the node 120 is implemented as part of a package of security utilities. The node 120 could also comprise part of an operating system, or part of a computer's hardware.

The node 120 includes an interface module 410 that is communicatively coupled to administration module 140. In an embodiment, the administration module 140 is hosted on a different computer than the extrusion detection node 120, and communications are transmitted between the extrusion detection node 120 and administration module 140 over a network 114.

The interface module 410 is configured to receive instructions from the administration module 140 that specify what data should be marked as sensitive, and what action to take when a release of the sensitive data from the client computer 110 is attempted. The interface module 410 parses the instructions and passes portions of it to the taint marking module 430 and the taint security module 460.

In an embodiment, the interface module 410 sends confirmations to the administration module 140 regarding the receipt of the instructions, and also confirms that steps in instructions protocols provided by the interface module 410 have been implemented. In another embodiment, the interface module 410 provides reports or log files to the administration module 140 regarding activity that has taken place on the client computer 110. A log file could include, for instance, information about the movement or transformation of sensitive data, a record of all the releases that were prevented by the extrusion detection node 120 within a period of time, or information about accesses to sensitive data. In an embodiment, the interface module 410 receives and responds to queries from the administration module 140 regarding activities carried out by the extrusion detection node 120.

In certain embodiments of the invention, as described in the next several paragraphs, the marking and tracking of sensitive data is accomplished through taint analysis as described earlier. However, taint analysis comprises just one way to perform these steps. In addition, various aspects of the methods described herein may also be used outside of a taint context to implement the invention.

The taint marking module 430 receives instructions from the interface module 410 and the taint tracking module regarding what data within the client computer 110 to mark as tainted 410 and proceeds to implement the taint. In an embodiment, the taint marking module 430 may alternatively or in addition receive instructions from a user of the client computer 110 regarding what data is tainted. In yet another embodiment, information that data should be tainted is sent to the computer 110 along with the data itself, and is provided to the extrusion detection node 120. Taint status information is stored in a taint memory 450, which in turn may comprise a memory of any type or structure suitable for storing taint information including a shadow memory, index or registry.

Indicating data as tainted can be accomplished in one of several ways. In one embodiment, the taint memory 450 comprises a shadow memory, a portion of memory (e.g. RAM, hard drive or other) reserved for the purpose of tracking the status of other memory on a client computer 110. For instance, a taint bit for a unit of memory on a hard drive could be reserved for storing information about whether the unit of memory is tainted. A taint bit could be reserved for each byte, group of bytes, or document, for instance. The taint bits collectively comprise the shadow memory. In another embodiment, the shadow memory includes a pointer to a taint data structure created to correspond to the tainted data. The taint data structure holds additional information about the nature of the taint associated with the corresponding memory, for example the level of sensitivity associated with the data or the action to be taken in the event that the data is observed exiting the enterprise. For instance, the data structure could indicate that the data is at a certain level of sensitivity and thus, attempts to release it from the enterprise should be blocked immediately and an alert sent to a designated administrator. The data structure could also include any other information related to a specific piece of tainted data.

In yet another embodiment, the taint marking module 430 maintains a taint index of address ranges on a hard drive of a computer 110 that are tainted. When data that is in one of these tainted ranges is read from the hard drive into memory, the memory into which it is read is marked as tainted. When a tainted piece of memory is written to the hard drive, the range of disk into which the memory is written is marked as tainted. The index is dynamically expanded and updated as tainted data is propagated.

As will be known to one of skill in the art, a taint marking module 430 may use a subset or combination of these and other methods to mark or indicate data stored in a memory as sensitive or tainted. In an embodiment, the taint marking module 430 uses different methods of taint marking for different types of memory within the computer. For instance, in such an embodiment, while taint information for data stored in the hard drive is maintained in a taint index, taint information about data stored in RAM is maintained in a shadow memory. This use of an index could be particularly suitable for hard drive data because this information presumably has a more "permanent" place in memory than information stored in RAM.

The taint tracking module 420 monitors transactions on the computer 110 and instructs the marking module 430 to propagate the taint as instructions are implemented involving tainted data. The taint is propagated at the level at which the taint is designated, for instance, at the document, portion of document, file, memory region, or byte level. In an embodiment, if a document is tainted, all the bytes of memory associated with the document are marked as tainted so that if copying of any part of the document takes place, the taint is propagated to the propagated data. The taint information is updated in real time, as the transaction takes place, although certain system maintenance activities, such as cleaning the index, or preparing log files, may take place at other times.

Anytime the value of a memory depends on the tainted data, the taint is applied to the propagated data. In the case of data movement instructions (for instance, LOAD, STORE, MOVE, PUSH, POP, etc.), the taint status of the source memory is propagated to the destination memory associated with the propagated data. In the case of arithmetic instructions (ADD, SUB, XOR, etc.), and other instructions (NOP, JMP, TEST, BGE, etc.), the destination memory associated with the propagated data is marked as tainted if any of the argument memory is marked as tainted, and the destination memory is marked as untainted if all of the argument memory is marked as untainted. In an embodiment, the taint tracking module 420 follows a taint propagation policy to decide when to propagated data should be marked as tainted. In accordance with such a policy, for instance, the marking module 430 marks the results of most data movement and arithmetic functions as tainted depending on the taint status of the arguments, but in certain cases, for instance, when the effect of an instruction is to always delete or null the tainted data, or when the outcome of the function does not otherwise depend on the input, the resulting memory is not tainted. For example, the effect of the operation A=A (XOR) A is to yield a value of 0, regardless of the value of the input. In an embodiment, the effect of such an instruction would be to clear the taint status of the data, regardless of the taint status of the argument(s). In an embodiment, the taint marking module 430 is capable of performing taint de-marking, and clearing the taint status of memory that no longer contains tainted data, for instance when tainted data is permanently deleted.

The transaction monitoring module 440 monitors one or more exits from the computer 110 in order to detect the potential release of tainted data. Leakage may take place from any of the multiple exits from the computer 110 including those discussed in connection with FIG. 2. In an embodiment, whenever a user attempts to print, for instance, the transaction monitoring module 440 checks to see whether tainted data is implicated in the transaction. The monitoring module 440 may implement this check at various levels. For instance, in an embodiment, the transaction monitoring module 440 attaches to operating system commands, for instance to print or write to an external storage. In another embodiment, the transaction monitoring module 440 includes application-specific software hooks that are triggered when a user attempts to release data through the application. Such a hook may be implemented in, for example, an email, conferencing, instant message, chat, or internet application.

When the potential release of outbound tainted data is attempted, the transaction monitoring module 440 alerts the taint security module 460. The taint security module 460 receives instructions from the interface module 410 regarding what action should be executed if the potential release of outbound tainted data is detected. The taint security module may follow the same policy regardless of the tainted data, or implement instructions that are specific to various categories of data or users.

This policy may specify, for instance, that the taint security module 460 implement any or a combination of interventions upon the potential release of outbound tainted data. For instance, the security module 460 could block the release or alert the user as to the potential release and prompt for additional verification or validation that the user has the authority to carry out the attempted activity. The security module 460 could send a message through the interface module 410 to the administration module 140 seeking additional permission for the requested transaction to take place. The taint security module 460 may take a further step in analyzing the potential leak, for instance checking to see if the recipient of an email containing outbound sensitive data is addressed to someone within the enterprise. If it is, the email is allowed to be sent, otherwise it is blocked. The taint security module 460 could also check the credentials of the user attempting the transfer including by requesting an authorization credential that could be used to override the actions of the extrusion detection node 120. The credential could be requested from a user, an administrator, or a credentials cache stored in the client 110 or other location. In the case of a file transfer via an email or other program, the security module 460 could also quarantine the tainted outbound data, and seek administrator approval prior to allowing the transfer to take place.

One or more steps of an intervention taken by the security module 460 may be transparent to the user, who is only alerted when an intervention results in the failure of the requested operation to complete.

Figure 5:
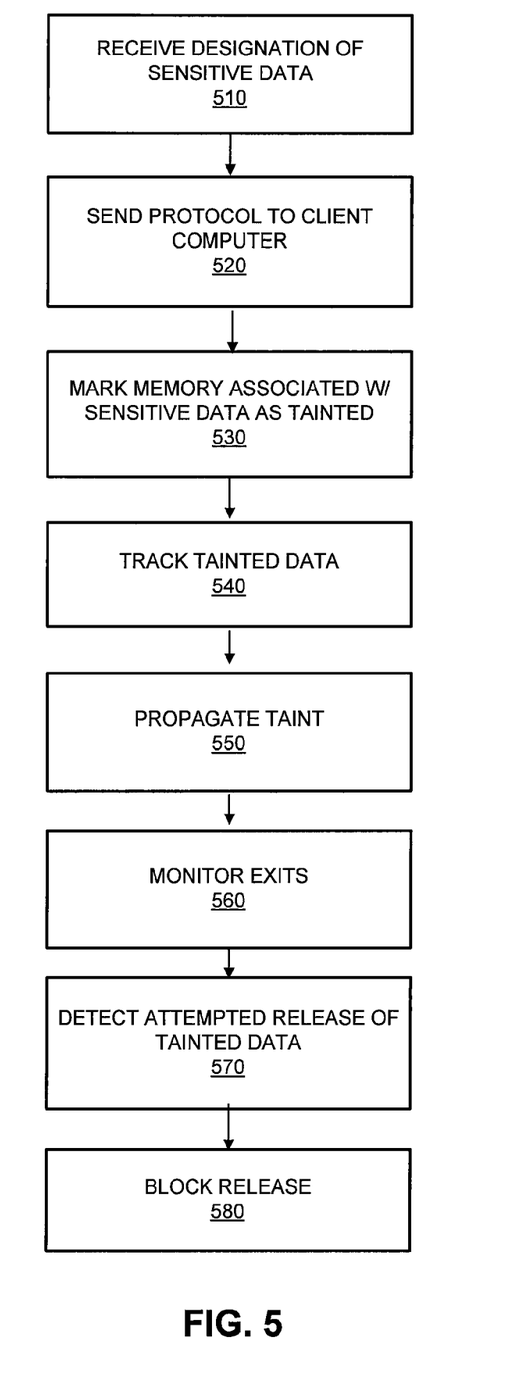
FIG. 5 is a flow chart illustrating steps performed by an administration module and an extrusion detection node according to one embodiment.

FIG. 5 is a flow chart illustrating steps performed by an administration module 140 and an extrusion detection node 120 according to one embodiment. Not every possible step is shown in the figure. In addition, some embodiments perform different steps in addition to, or instead of, the ones described herein. Furthermore, the order of the steps can vary from that described herein. In other embodiments, some or all of the steps are performed by entities other than an extrusion detection node 120.

In an embodiment, the process begins when a user or administrator marks a document, for instance containing credit card numbers, as sensitive. This information is received 510 by the administration module 140 and used by a protocol module 310 of the administration module 140 to develop a protocol under which the document becomes designated as tainted. In the process illustrated in FIG. 5, no additional information is provided by the user and the protocol module 310 defaults to a protocol in which all releases of the sensitive data are prohibited, and the protocol is to be sent to all client computers 120 within an enterprise 100. However in other processes, the user may specify that only certain releases trigger an intervention by the extrusion detection node 120, and that the intervention varies based on the type of release or the credentials of the potential releaser.

The protocol module 310 generates instructions based on the information provided by the user or administrator that are sent 520 by the communications module 320 of the administration module 140 to one or more client computers 110 within the enterprise 100. The interface module 410 of an extrusion detection node 120 of a client computer 110 receives these instructions and passes them to a taint marking module 430. It also instructs a taint security module 460 to block all attempted leaks of the tainted data.

The marking module 430 marks 530 memory associated with the identified sensitive data as tainted. In an embodiment, the marking module 430 implements several taint marking protocols at once, and scans the memory of the client computer 110 for the sensitive data to be marked.

The technique used by the marking module 430 to taint the data varies depending on where the sensitive data is stored. As copies of the tainted data are modified and accessed on the client machine 110, the status of the data is tracked 540 by the taint tracking module 420, and the taint is propagated 550 on the client machine 110. Thus, as a user encrypts the data, or applies any type of obfuscation, such as applying an XOR function to every byte of the data, the taint is propagated. This way, even though the data is in an obfuscated or hidden form, it is still recognized by the extrusion detection node 120.

The taint monitoring module 440 monitors 560 all potential exits from the client machine. When a user tries to print or email the credit card information, the release of the tainted data is detected 570. In accordance with the policy, the action is blocked, by a security module 460 of the extrusion detection node 120.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for preventing release of sensitive data from a computer, the method comprising the steps of:
 indicating in a taint memory of the computer a location of sensitive data stored in an other memory of the computer, the taint memory comprising a plurality of taint bits, each taint bit corresponding to a unit of the other memory;

responsive to a transaction that propagates the sensitive data in the other memory of the computer to a new location in the other memory, indicating in the taint memory that the new location stores sensitive data;

monitoring an exit of the computer to detect a potential release of outbound data from the computer;

responsive to detecting the potential release of outbound data, determining, using the indications in the taint memory, whether the outbound data are sensitive; and responsive to the outbound data being sensitive, executing an action to prevent the release from occurring.

2. The method of claim 1, wherein the action comprises blocking the release of the outbound sensitive data.

3. The method of claim 2, further comprising providing a message to a user attempting the potential release of the outbound sensitive data that the release has been blocked.

4. The method of claim 1, wherein the action comprises quarantining the outbound sensitive data.

5. The method of claim 1, wherein the action comprises one of:

performing a check to determine whether the potential release of the outbound sensitive data is authorized and sending an alert to an administrator.

6. The method of claim 1, further comprising:

logging the potential release of the outbound sensitive data and the action taken to prevent the release from occurring in a log file; and sending the log file to an administration module.

7. The method of claim 1, wherein the location of the sensitive data comprises an address in the other memory of the computer where the sensitive data are stored.

8. The method of claim 1, wherein the exit comprises one from the group of: a printer port, a network port, and an external memory port.

9. The method of claim 1, further comprising responsive to a transaction deleting sensitive data in the other memory, clearing a portion of the taint memory corresponding to a location in the other memory from which the sensitive data were deleted.

10. The method of claim 1, further comprising:

receiving a protocol comprising a data definition and an action to be taken upon detecting potential release of sensitive data that meet the data definition; and wherein the step of executing further comprises determining that the outbound sensitive data meet a data definition of the protocol, and executing the action associated with the data definition according to the protocol.

11. An extrusion detection system for preventing the release of sensitive data from an enterprise, the system comprising:

a non-transitory computer-readable storage medium storing an executable computer-program module comprising an administration module for broadcasting a plurality of taint instructions, each instruction comprising a definition of sensitive data; and a plurality of extrusion detection nodes, each node for:

responsive to the taint instructions, indicating in a taint memory of a computer a location of sensitive data stored in an other memory of the computer, the taint memory comprising a plurality of taint bits, each taint bit corresponding to a unit of the other memory;

responsive to a transaction that propagates the sensitive data in the other memory of the computer to a new location in the other memory, indicating in the taint memory that the new location stores sensitive data;

monitoring an exit of the enterprise to detect a potential release of outbound data from the enterprise;

responsive to detecting the potential release of outbound data, determining, using the indications in the taint memory, whether the outbound data are sensitive; and responsive to the outbound data being sensitive, executing an action to prevent the release from occurring.

12. The extrusion detection system of claim 11, wherein the administration module is adapted to generate a taint instruction responsive to an input provided from an extrusion detection node.

13. The extrusion detection system of claim 11, wherein each of the plurality of extrusion detection nodes is adapted to detect a potential release of tainted data from the enterprise.

14. The extrusion detection system of claim 11, wherein an extrusion detection node of the plurality of extrusion detection nodes is adapted to detect the potential release of tainted data by monitoring application-level commands made on a client computer.

15. The extrusion detection system of claim 11, wherein the administration module is configured to perform an analysis of taint activity occurring at the plurality of extrusion detection nodes.

16. The extrusion detection system of claim 15, wherein the analysis comprises a post-release investigation analysis.

17. A non-transitory computer-readable storage medium storing executable computer program instructions for preventing unauthorized release of data from a computer, the computer program instructions for performing steps comprising:

indicating in a taint memory of the computer a location of sensitive data stored in an other memory of the computer, the taint memory comprising a plurality of taint bits, each taint bit corresponding to a unit of the other memory;

responsive to a transaction that propagates the sensitive data in the other memory of the computer to a new location in the other memory, indicating in the taint memory that the new location stores sensitive data;

monitoring an exit of the computer to detect a potential release of outbound data from the computer;

responsive to detecting the potential release of outbound data, determining, using the indications in the taint memory, whether the outbound data are sensitive; and responsive to the outbound data being sensitive, executing an action to determine whether to prevent the release from occurring.

18. The computer-readable storage medium of claim 17, wherein the action comprises requesting an authorization credential to execute the release of the outbound sensitive data from the exit; and further comprising:

responsive to receiving the requested authorization credential, permitting the release of the outbound sensitive data.

19. The computer-readable storage medium claim 18, wherein the action comprises requesting an authorization credential from one of: a credentials cache, an administrator, and a user attempting the potential release of the sensitive data from the computer.

* * * * *